United States Patent
Friedrich et al.

(10) Patent No.: US 7,376,391 B2
(45) Date of Patent: May 20, 2008

(54) WIRELESS DATA TRANSMISSION BETWEEN BASE STATION AND TRANSPONDER WITH ENCODING/DECODING PARAMETER ADJUSTED DEPENDENT ON HEADER SYMBOL DURATION

(75) Inventors: Ulrich Friedrich, Ellhofen (DE); Martin Fischer, Gleichen (DE)

(73) Assignee: ATMEL Germany GmbH, Heilbronn (DE)

( * ) Notice: Subject to any disclaimer, the term of this patent is extended or adjusted under 35 U.S.C. 154(b) by 622 days.

(21) Appl. No.: 10/896,670

(22) Filed: Jul. 21, 2004

(65) Prior Publication Data

US 2005/0018639 A1  Jan. 27, 2005

(30) Foreign Application Priority Data

Jul. 23, 2003 (DE) ............... 103 35 009

(51) Int. Cl.
*H04B 5/00* (2006.01)

(52) U.S. Cl. ............ 455/41.1; 455/41.2; 455/39; 455/44; 455/69; 340/10.1; 340/10.2; 340/10.3

(58) Field of Classification Search ........... 455/41.1, 455/69, 41.2, 39, 44; 340/10.1, 10.3, 10.4, 340/10.2

See application file for complete search history.

(56) References Cited

U.S. PATENT DOCUMENTS 5,754,651 A    5/1998  Blatter et al.
5,838,873 A   11/1998  Blatter et al.
6,044,333 A *  3/2000  Stobbe et al. ............... 702/106

(Continued)

FOREIGN PATENT DOCUMENTS

DE     101 38 217     3/2003

(Continued)

OTHER PUBLICATIONS

S. Bakhtiyari et al., "Practical Implentation of a Mobile Data Link Protocol With a Type II Hybrid ARQ Scheme and Code Combining", 1993 43$_{rd}$ IEEE Vehicular Technology Conference, May 18-20, 1993, NJ USA, pp. 774-777.

(Continued)

*Primary Examiner*—Rafael Perez-Gutierrez
*Assistant Examiner*—Khai Nguyen
(74) *Attorney, Agent, or Firm*—W. F. Fasse; W. G. Fasse

(57) ABSTRACT

Data encoded in packets modulated onto a carrier wave is transmitted between a base station and a transponder. Each packet includes a header section containing at least a reference symbol, and a further section such as a data section. In the transponder, the time duration of the reference symbol is determined, and a parameter is adjusted dependent on the determined duration. The parameter determines at least a property, such as the time resolution, of the encoding and/or decoding operation, and may be the clock frequency of a counter circuit or the charging current of an RC-circuit used to determine the duration of the symbols. The parameter may initially be set to a minimum default value, which is increased if the determined duration is less than or equal to a specified threshold. Thereby, power consumption is minimized while ensuring reliable encoding and decoding over a large range of transmission distances.

28 Claims, 2 Drawing Sheets

U.S. PATENT DOCUMENTS

| | | | | |
|---|---|---|---|---|
| 6,466,609 | B2* | 10/2002 | Koslar et al. | 375/139 |
| 6,836,208 | B2* | 12/2004 | Kuttruff et al. | 340/10.51 |
| 6,882,826 | B2* | 4/2005 | Hediger et al. | 455/41.1 |
| 7,142,815 | B2* | 11/2006 | Desjeux et al. | 455/41.2 |
| 2002/0136157 | A1* | 9/2002 | Takaoka et al. | 370/208 |
| 2003/0027542 | A1* | 2/2003 | Hediger et al. | 455/295 |
| 2003/0133435 | A1 | 7/2003 | Friedrich | |
| 2005/0053024 | A1 | 3/2005 | Friedrich | |

FOREIGN PATENT DOCUMENTS

| | | |
|---|---|---|
| DE | 102 04 347 | 8/2003 |
| JP | 09-083583 * | 3/1997 |
| WO | WO 00/45330 | 8/2000 |
| WO | WO 01/54339 | 7/2001 |

OTHER PUBLICATIONS

S. Falahati et al.; "Hybrid Type-II ARQ Schemes with Adaptive Modulation Systems for Wireless Channels"; 1999 IEEE Vehicular Technology Conference, Sep. 19-22, 1999; pp. 2691-2695.

U.S. Appl. No. 10/503,256, filed on Aug. 30, 2004, Ulrich Friedrich.

* cited by examiner

WIRELESS DATA TRANSMISSION BETWEEN BASE STATION AND TRANSPONDER WITH ENCODING/DECODING PARAMETER ADJUSTED DEPENDENT ON HEADER SYMBOL DURATION

CROSS-REFERENCE TO RELATED APPLICATION

This application is related to U.S. application Ser. No. 10/896,674 filed Jul. 21, 2004. The entire disclosure of the related application is incorporated herein by reference.

PRIORITY CLAIM

This application is based on and claims the priority under 35 U.S.C. §119 of German Patent Application 103 35 009.8, filed on Jul. 23, 2003, the entire disclosure of which is incorporated herein by reference.

FIELD OF THE INVENTION

The invention relates to a method for carrying out wireless data transmission between a base station and a transponder, especially a passive transponder, wherein data packets that each include a header section with at least one symbol and at least one further section are modulated onto electromagnetic carrier waves transmitted between the base station and the transponder.

BACKGROUND INFORMATION

Transmission methods of the above mentioned general type forming the general field of this invention, between one or more base stations or reader devices and one or more transponders, are typically used for contactless identification systems, or particularly so-called radio frequency identification (RFID) systems, for example. It is also possible to integrate one or more sensors, for example for carrying out a temperature measurement, on the transponder. Such transponders are referred to as remote sensors. In this context, the transponder or remote sensor transmits, or especially backscatters, identification information or sensor information in a contactless manner from the transponder or sensor to the base station or reader device. Throughout this specification, the general term "transponder" should be understood to cover both passive and semi-passive transponders, as well as remote sensors that include sensor elements integrated in or connected to a transponder.

Such transponders, or particularly the receiving/backscattering or receiving/transmitting circuit arrangements thereof, typically do not include an active transmitter for actively transmitting the relevant data to the base station. Instead, the transponders are non-active systems that can be designated as passive systems if they do not comprise their own power supply, or as semi-passive systems if they do comprise their own power supply. Especially passive transponders derive the energy necessary for their operation from the electromagnetic field emitted by the base station.

In such non-active systems, the data transmission in the distant or far field of the base station using UHF waves or microwaves generally uses a so-called backscattering or backscatter-coupling between the transponder and the base station. In this regard, the base station emits electromagnetic carrier waves, which are modulated by the receiving/backscattering arrangement of the transponder according to a prescribed modulation process in accordance with the data that are to be transmitted from the transponder to the base station. With this modulation, the waves are then reflected or backscattered from the transponder back to the base station. The typical modulation processes used in this context include amplitude modulation, phase modulation, and amplitude shift keying (ASK) subcarrier modulation in which the frequency or the phase position of the subcarrier is varied.

The prior German Patent Applications DE 102 04 347 and DE 101 38 217 A1 (and its counterpart US Application Publication 2003/0133435 A1, the disclosure of which is incorporated herein by reference) disclose methods for carrying out a wireless data transmission between a base station and a transponder, in which data packets to be transmitted each comprise a header section, a data section including the useful data to be transmitted, and an end section. The useful data to be transmitted are encoded and transmitted through the use of suitable defined symbols that are identified in the header section of the data packet.

In this regard, a symbol serves for the definition or interpretation of the value of a character in the character sequence representing or embodying the data being transmitted. Such a symbol is typically represented or defined in connection with a time duration between two successive field gaps or so-called "notches" in the header section of the data packet. Such a field notch can be achieved or generated, for example in connection with an amplitude modulation, by the suppressing or damping of the carrier signal. Alternatively, as another example in the context of a double or dual sideband modulation, such a field notch can be generated by switching over the phase position of the carrier signal. The transponder decodes the received data packets on the basis of the symbols contained and defined in the header section, more particularly in connection with the time durations that have been respectively allocated to the respective symbols. For determining the value of a respective character, the transponder compares the determined time duration of the respective character with the time durations of the symbols as defined in the header section of the data packet.

In the data transmission from the transponder to the base station, in some cases it is provided that each character or bit that is to be transmitted is transmitted synchronously with a clock signal or clocking pulse prescribed by the base station. In this context, the modulation state is fixed and/or known at the beginning of the time interval, and then a change-over of the modulation state is carried out after the elapse of the time duration of the symbol allocated in the header section to the character or bit. As an alternative thereto, the data transmission is typically carried out a synchronously.

Through the selection of the time intervals or particularly the time durations respectively allocated to the respective symbols, it is possible to adapt the transmission rate to the prevailing transmission conditions within a certain transmission rate range. This range of the transmission rate is limited, among other things, by the point at which the transponder, or rather particularly the encoding/decoding unit provided in the transponder for this purpose, can no longer resolve or distinguish the time differences between various different time durations that are respectively allocated to the symbols or characters. In this regard, a higher time resolution generally goes along with a higher current consumption of the transponder, for example because it is necessary to increase the clock frequency of a counter used for the time duration determination, or the charging current of a functionally corresponding analog RC-stage in the encoding/decoding unit. Because a rather low power density prevails in the far field of the electromagnetic waves emitted by the base station, and this power density serves for the power supply of the transponder (especially the passive transponder), the achievable transmission distance or range is reduced as the current consumption of the transponder increases. The parameter or parameters determining the encoding or the decoding, or especially the encoding/decoding unit, is thus typically statically configured in such a manner so as to achieve a sufficient compromise between the capability of a high time resolution and conditional thereon also a high achievable transmission rate on the one hand, and a low current consumption on the other hand.

SUMMARY OF THE INVENTION

In view of the above, it is an object of the invention to provide a method for wireless data transmission between a base station and a transponder with a relatively large achievable transmission distance throughout a large transmission rate range in comparison to the prior art, with an optimized power requirement and with relatively low effort and expense. The invention further aims to avoid or overcome the disadvantages of the prior art, and to achieve additional advantages, as apparent from the present specification. The attainment of these objects is, however, not a required limitation of the present invention.

The above objects have been achieved according to the invention in a method of wireless data transmission between a base station and a transponder, especially a passive transponder. The method generally involves a step of modulating data packets onto electromagnetic carrier waves that are transmitted between the base station and the transponder. Each one of the data packets comprises a header section including at least one symbol (e.g. a reference symbol), and at least one further section such as the data section. The symbol or symbols are especially data encoding symbols. Further in the method according to the invention, the time duration of at least one symbol (e.g. the reference symbol) in the header section of a data packet received in the transponder is determined, and a parameter that determines at least a property of the encoding and/or decoding operating mode is variably adjusted in response to and dependent on the determined time duration of the reference symbol.

Through such measures in the inventive method, a dynamic adaptation of the encoding and/or decoding characteristics of the transponder can be carried out with respect to the prevailing transmission conditions. For example, for operation with a large distance between the base station and the transponder, through suitable selection of the time duration of a reference symbol in the header section, the parameter determining the selected property of the encoding and/or decoding operating mode can be adjusted in such a manner, so that the current consumption of the encoding/decoding unit is relatively low, whereby a rather large transmission distance or range can be achieved. If, on the other hand, sufficient power is available to the transponder from the electromagnetic waves emitted by the base station, the pertinent parameter and therewith the operation of the encoding/decoding unit is adjusted in such a manner, so that a high data rate can be achieved. Thus, the transmission rate range is thereby significantly increased in comparison to a method in which the encoding and/or decoding is carried out with constant pre-specified settings.

According to a further feature of the inventive method, the pertinent selected parameter determines the time resolution of the encoding and/or of the decoding, i.e. the time resolution is the property of the encoding and/or decoding that is determined by the selected parameter. Through such an adaptation of the time resolution, an effective control of the current consumption of the transponder can be achieved. Alternative possibilities of the pertinent property of the encoding and/or decoding are that the selected parameter determines the frequency and/or amplitude resolution of the transponder, or effects a switch-over of the transponder between different encoding or decoding processes.

In yet another embodiment of the inventive method, the pertinent selected parameter is a charging current of an RC-circuit that serves for determining the time durations of the respective symbols. For example, in this context, a capacitor of the RC-circuit can be charged through a resistor of the RC-circuit with a defined charging current during the time duration of a certain specified symbol, and then the resulting voltage value on the charged capacitor is stored in a storage or memory circuit.

A further feature of the inventive method specifies that the charging current is set to a prescribed minimum value, e.g. a default value, before the reception of a first data packet. This pre-specified minimum value of the charging current is then increased upon the reception of the first data packet if a voltage value of the RC-circuit associated with the determined time duration of the selected symbol of the data packet is less than or equal to an adjustable threshold or limit value. On the other hand, if the voltage value associated with the determined time duration of the symbol of the received data packet is greater than the adjustable threshold or limit value, then the pre-specified minimum default value of the charging current will be maintained without change.

According to a further embodiment of the method according to the invention, the pertinent selected parameter is a timing or clock frequency of a counter circuit that serves for determining the time durations of the respective symbols. The control of the clock frequency of the counter circuit dependent on the time duration of a given symbol in the header section of the data packet ensures, on the one hand, that the clock frequency of the counter circuit is adjusted in such a manner so that the time resolution is sufficient for reliably and securely encoding or decoding all characters, and on the other hand, that the clock frequency is minimized in such a manner so that the current consumption of the transponder is reduced to a minimal value in relation to the particular pertaining data transmission rate. In other words, the clock frequency is set to such a value that is just sufficient to achieve a reliable encoding and/or decoding of all characters of the data packet, without being higher than necessary, so as to keep the current consumption as low as possible while still achieving a reliable data encoding and/or decoding.

According to a further feature of the inventive method, the clock frequency is initially set to a prescribed minimum value or default value before the reception of a first data packet. Then, after reception of the first data packet, this pre-set minimum value of the clock frequency is increased if a counter value of the counter circuit associated with the determined time duration of the selected symbol of the received data packet is less than or equal to a pre-adjusted threshold or limit value. On the other hand, if the counter value of the counter circuit associated with the determined time duration of the selected symbol of the received data packet is greater than the pre-adjusted threshold or limit value, then the pre-specified minimum value of the clock frequency will be maintained without change.

In this manner, analogously as in the embodiment in which the parameter is a charging current of an RC-circuit, it is ensured that a transponder located in the far field of the base station can be operated and driven with a minimal clock frequency or minimal charging current, which in turn means a minimal current consumption. This is significant because the power available for supplying energy to the transponder is relatively low in the far field of the base station. The adjustment of the clock frequency or the charging current involves a balancing in order to achieve a reliable data encoding and/or decoding, while still accommodating the available power that can be extracted for the energy supply of the transponder, and also minimizing the current consumption of the transponder.

Particularly, if the counter value is less than the adjustable threshold or limit value, this means that the clock frequency is not sufficient for achieving a reliable decoding and/or encoding and must therefore be increased. If adequate supply power is available in order to support the increased current consumption that is necessitated by the increased clock frequency, then the data transmission rate can be correspondingly increased. On the other hand, if the current consumption is too great in this case, then, for example, a reset of the transponder can be carried out, such that the transponder no longer participates in the data transmission, and the transmission would have to be reestablished, if possible, using a suitable reduced current consumption.

Since the data transmission fundamentally begins with a relatively low current consumption, which is then stepped-up only if the conditions permit and if a higher current consumption is necessary, the base station is able to initially call-up or communicate with transponders that are located at a relatively great distance away from the base station, e.g. in the far field of the base station. Moreover, by appropriately setting the time duration of the selected symbol, the base station can thereby control whether or not a transponder located relatively far from the base station, i.e. in the far field of the base station, will participate in a communication, e.g. with a relatively low data transmission rate.

In a further embodiment of the invention, the parameter is adjusted dependent on the determined time duration of the first symbol included in the header section of the data packet. In other words, the reference symbol is positioned as the first symbol in the header section. This achieves a simple realization of the adjustment of the parameter, especially because the first symbol of the header section can be agreed to be a symbol having the maximum duration or the minimum duration. Thus, when the parameter is adjusted based on such a maximum or minimum duration of all of the available symbols, for example, this can avoid the problem of measured values falling below or exceeding the following symbols in the decoding. In other words, if the parameter is properly adjusted based on the maximum or minimum duration among all of the symbols, represented by the duration of the first symbol, then it is ensured that proper functionality will also be achieved for all of the symbols.

According to another feature of the inventive method, the at least one further section of the data packet (in addition to the header section) is a data section, which contains data that are encoded and transmitted by means of at least one further symbol included in the header section.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

Figure 1:
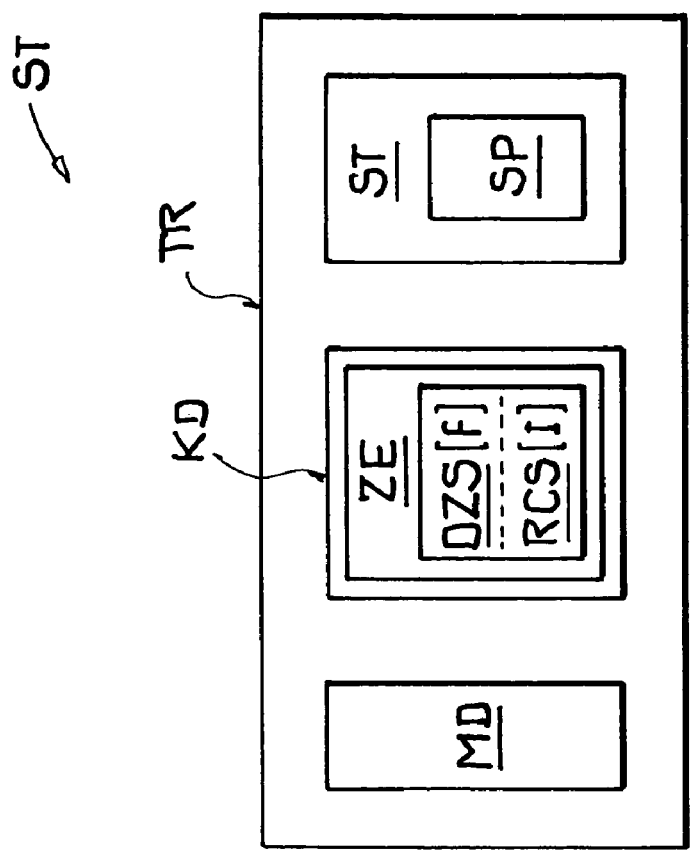
FIG. 1 is a schematic block circuit diagram of a radio frequency identification (RFID) system including a base station and a transponder.

As shown in the schematic block circuit diagram of FIG. 1, an RFID system ST includes a base station BS and a passive transponder TR, and carries out a bi-directional transmission of data packets DP in a wireless manner between the base station BS and the transponder TR. More particularly, the base station BS emits electromagnetic carrier waves and the transponder TR extracts its supply power P needed for powering its operation from the electromagnetic field emitted by the base station BS. Moreover, the transponder TR receives and processes data packets DP received from the base station BS. Also, in order to transmit data in data packets DP from the transponder TR to the base station BS, the electromagnetic carrier waves emitted by the base station BS are modulated in accordance with the data to be transmitted by the transponder TR and are reflected in a modulated manner from the transponder TR back to the base station BS. Thus, the transponder TR is preferably a passive transponder carrying out a backscattering communication to the base station BS.

In addition to other circuit components that are not shown, the transponder TR further comprises a modulator/demodulator unit MD, which may comprise, e.g., a receiver-signal-strength-indicator (RSSI) circuit for recovering the signal, an encoding/decoding unit KD coupled to the modulator/demodulator unit MD, and a control unit ST coupled with the encoding/decoding unit KD. The input signals received in the transponder TR are demodulated in the modulator/demodulator unit MD, while signals to be transmitted are correspondingly modulated in the modulator/demodulator unit MD. In connection therewith, an encoding and/or decoding of data packets DP takes place in the encoding/decoding unit KD. For this purpose, the encoding/decoding unit KD comprises a time acquisition or registration unit ZE for determining the time duration of modulation states, or particularly determining the time spacings of field gaps or so-called "notches" between successive symbols of the data packet. This time acquisition unit ZE is preferably embodied as a digital counter circuit DZS or alternatively as an analog RC-circuit RCS.

Among other things, the control unit ST serves for actuating the encoding/decoding unit KD in a controlled manner, and comprises a memory SP, which serves to store values determined in the time acquisition unit ZE as well as reference values. If the time acquisition unit ZE is concretely embodied as a digital counter circuit DZS, then the clock frequency f of the counter circuit DZS is provided by the control unit ST. On the other hand, if the time acquisition unit ZE is concretely embodied as an RC-circuit RCS, then the charging current I thereof is prescribed by the control unit ST. In this context, the pertinent property of the encoding and/or decoding operation is the time resolution thereof, and the clock frequency f or the charging current I is the selected parameter that determines this property, because this parameter f or I specifies the time resolution capability of the time acquisition ZE that determines the time duration of the symbols or characters.

Figure 2:
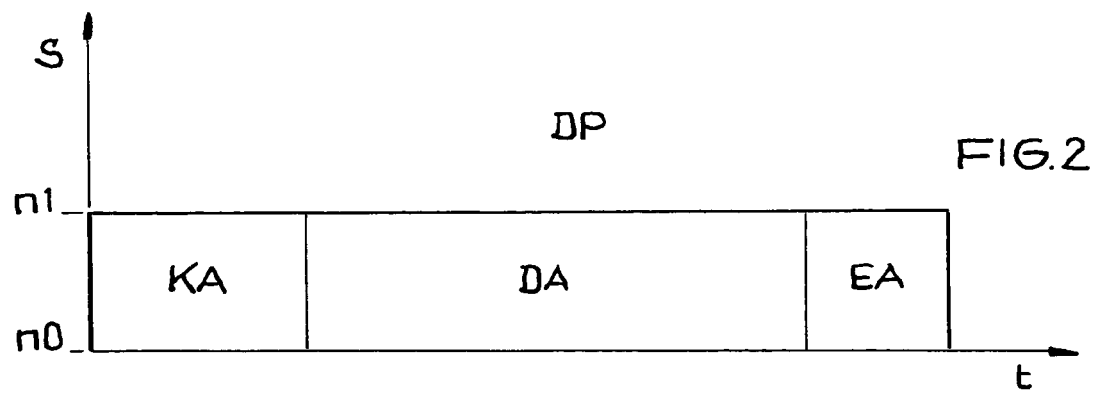
FIG. 2 is a schematic diagram representing a data packet for transmitting data in the inventive method, wherein the data packet includes a header section, a data section, and an end section.

The schematic diagram of FIG. 2 shows a data packet DP that is transmitted from the base station BS to the transponder TR as shown in FIG. 1, at the output of the modulator/demodulator MD. As schematically shown, the data packet DP includes a header section KA, a following data section DA containing the useful data to be transmitted, and a final end section EA.

Figure 3:
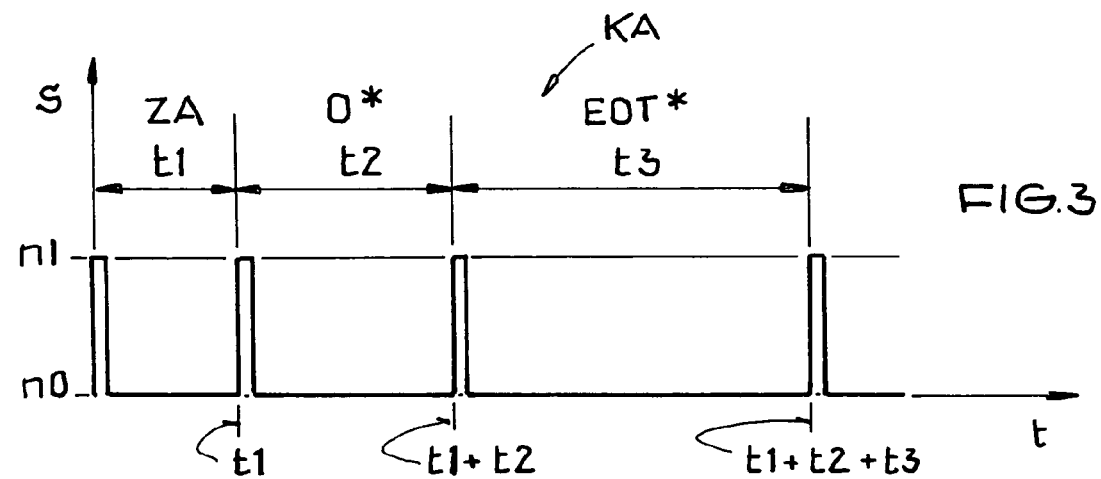
FIG. 3 is a schematic diagram representing details of the header section of the data packet shown in FIG. 2.

The header section KA of the data packet DP according to FIG. 2 is shown in detail by itself in FIG. 3. This illustrated header section KA contains three symbols ZA, 0* and EOT*. These symbols, which are essentially defined in the header section KA, are then used for representing respective characters of the data in the data section DA. The symbols ZA, 0* and EOT* are generated or represented by successive field gaps or so-called "notches" of the carrier signal S emitted by the base station BS. In FIG. 3, these "notches" in the signal S are represented as respective short pulses. The respective distinct symbols are defined by the respective different time durations between the successive pulses. Namely, the first symbol ZA has a time duration t1, the second symbol 0* has a time duration t2, and the third symbol EOT* has a time duration t3. These time durations t1, t2 and t3 are detected and determined by the time acquisition unit ZE of FIG. 1.

Particularly, if the time acquisition unit ZE is embodied as a digital counter circuit DZS, then the counter circuit simply counts during the time duration of each respective symbol, and respective counter values associated respectively with each of the time durations t1, t2 and t3 are stored in the memory SP of the control unit ST. On the other hand, if the time acquisition unit ZE is embodied as an RC-circuit RCS, then the RC-circuit RCS charges a capacitor during the time of each respective symbol, and the resulting voltage values of the charged capacitor respectively associated with each of the time durations t1, t2 and t3 are stored in the memory SP.

The clock frequency f of the counter circuit DZS or the charging current I of the RC-circuit RCS as the time acquisition ZE is initialized with a specified minimum default value by the control unit ST after the start of the transponder TR. Thereby, a minimal current consumption of the transponder TR initially arises. This makes it possible for the transponder TR to be activated or started-up even also in the far field of the emitted electromagnetic field of the base station BS.

After receiving a first data packet DP transmitted from the base station BS, and particularly after the time duration t1 of the first symbol ZA has been determined, the clock frequency f of the counter circuit DZS or the charging current I of the RC-circuit RCS in the transponder TR is adjusted depending on the determined time duration t1. For this purpose, the counter value or voltage value associated with the determined time duration t1 is compared by the control unit ST to a reference value stored in the memory SP thereof. If the counter value or the voltage value is less than or equal to the stored reference value, then the control unit ST increases the clock frequency f or the charging current I. Otherwise, the clock frequency f or the charging current I is maintained without change. If applicable, the increase of the clock frequency or the charging current can be carried out in a one-step manner or in several steps or stages, for example proportionally to the difference between the determined value and the stored value.

Through the increase of the clock frequency f or the charging current I, the transponder TR can be operated with a higher data transmission rate, because in such an operating mode, the time acquisition unit ZE can still distinguish in time between or among the respective time durations t1, t2 and t3 respectively associated with the symbols ZA, 0*, and EOT*, even though the differences between the time durations t1, t2 and t3 become smaller due to the higher data transmission rate. Thus, through the use of the dynamic switching or adjustment of the clock frequency f or the charging current I, a large data transmission rate range can be achieved, while simultaneously achieving large transmission distances due to the current-saving start-up of the transponder TR with an initial low current consumption.

For transmitting the useful data in the data section DA of the data packet DP, the base station BS generates a succession of field gaps or notches in the emitted signal S, whereby the time spacing of these notches is specified by or corresponds to the time durations of the symbols used for encoding the characters to be transmitted. Upon receiving this transmission, the transponder TR measures the time spacing of these field gaps or notches by means of the time acquisition unit ZE, at the time resolution that has been set on the basis of the first measured time duration t1, and then compares these measured time values with the time durations t2 and t3 of the symbols 0* and EOT*. In this context, the symbol 0* or rather its associated time duration t2 is used for encoding and/or decoding the binary characters "0" and "1" which make up the useful data to be transmitted in the data section DA, e.g. represented as a sequence of binary bits. In this regard, a binary character transmitted and received in the data section DA having a time duration less than the time duration t2 associated with the symbol 0* is interpreted in the transponder TR as a "0". On the other hand, a character in the data section DA having a time duration greater than t2 and less than the time duration t3 associated with the symbol EOT* is interpreted as a "1". Furthermore, the symbol EOT* and its associated time duration t3 serve to represent or indicate the end of a data packet DP, and for this purpose is transmitted in the end section EA of the data packet DP. In that regard, essentially any desired signal form or forms can be used as long as they are derived from or representative of the time duration t3. If the time duration between two successive field gaps or "notches" in the signal is greater than the time duration t3, then the transponder TR thereby recognizes the end of this data packet DP.

As an alternative, it is further possible to simply transmit a single further symbol 0* or EOT* in addition to the symbol ZA in the header section KA, and to calculate the other time durations of any other symbols based on prescribed divider ratios of the time duration of the symbols transmitted in the header section. This calculation can easily be carried out in the transponder.

The data transmission from the transponder TR to the base station BS can similarly be carried out with the time resolution that has been set on the basis of the time duration t1 of the respective selected symbol. For example, this transmission can be carried out according to the method disclosed in the German Patent Application DE 102 04 347.

In the particular example embodiment illustrated and described herein, the property of the encoding and/or decoding operation that is determined by the selected parameter is or relates to the time resolution of the encoding and/or decoding. Nonetheless, in alternative embodiments of the invention, it is possible to use other or further parameters that determine the encoding and/or decoding operating mode depending on the character representation information, e.g. the time duration specified by the first symbol included in the header section of the data packet. For example, the selected parameter may switch the encoding operation between various different encoding processes.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of carrying out a wireless data transmission between first and second units including a base station and a transponder, comprising the following steps:
   (a) modulating a data packet onto an electromagnetic carrier wave and transmitting said carrier wave with said data packet modulated thereon from said first unit to said second unit, wherein said data packet includes a header section containing a plurality of symbols including a reference symbol and a data encoding symbol, and further includes at least one further section comprising a data section containing encoded data that is encoded by data characters defined with reference to said data encoding symbol;
   b) receiving said carrier wave with said data packet modulated thereon in said second unit;
   c) in said second unit, determining a reference time duration of said reference symbol and a time duration of said data encoding symbol in said header section of said data packet;
   d) in said second unit, adjusting, to an adjusted value dependent on said reference time duration, a parameter that determines at least one property of an encoding and/or decoding process used for encoding and/or decoding encoded data in said second unit; and
   e) in said second unit, decoding said encoded data using said decoding process having said property thereof determined by said parameter adjusted to said adjusted value;
   wherein:
      said decoding of said encoded data using said decoding process comprises recognizing said data characters by determining respective time durations of said data characters in said data section relative to said time duration of said data encoding symbol in said header section;
      said determining of said respective time durations in said decoding process is carried out by a time acquisition unit;
      said property of said decoding process is a time resolution of said determining of said respective time durations in said decoding process carried out in said time acquisition unit; and
      said time acquisition unit includes an RC charging circuit as a time counter and said parameter is a charging current of said RC charging circuit, or said time acquisition unit includes a digital counter circuit as a time counter and said parameter is a clock frequency of said digital counter circuit.

2. The method according to claim 1, wherein said first unit is said base station, said second unit is said transponder, and said transmitting in said step a) is an active transmitting of said electromagnetic carrier wave from said base station to said transponder.

3. The method according to claim 1, wherein said first unit is said transponder, said second unit is said base station, and said transmitting in said step a) is a passive backscattering reflection of said electromagnetic carrier wave from said transponder back to said base station.

4. The method according to claim 1, wherein said time acquisition unit includes said RC charging circuit, and said parameter is said charging current of said RC charging circuit that is used for said determining of said reference time duration.

5. The method according to claim 4, wherein said symbols in said header section additionally include a further symbol, and said method additionally comprises determining a time duration of said further symbol using said RC charging circuit.

6. The method according to claim 4, further comprising:
   initially setting said charging current to a prescribed minimum value before said receiving of said data packet being a first data packet of a complete transmission including plural successive data packets;
   after said receiving of said first data packet and said determining of said reference time duration, increasing said charging current from said prescribed minimum value to said adjusted value that is higher than said prescribed minimum value, if a voltage value of said RC charging circuit corresponding to said reference time duration is less than or equal to an adjustable threshold value; and
   after said receiving of said first data packet and said determining of said reference time duration, maintaining said charging current at said prescribed minimum value without change, if said voltage value of said RC charging circuit corresponding to said reference time duration is greater than said adjustable threshold value.

7. The method according to claim 1, wherein said time acquisition unit includes said digital counter circuit, and said parameter is said clock frequency of said digital counter circuit that is used for said determining of said reference time duration.

8. The method according to claim 7, wherein said symbols in said header section additionally include a further symbol, and said method additionally comprises determining a time duration of said further symbol using said digital counter circuit.

9. The method according to claim 7, further comprising:
   initially setting said clock frequency to a prescribed minimum value before said receiving of said data packet being a first data packet of a complete transmission including plural successive data packets;
   after said receiving of said first data packet and said determining of said reference time duration, increasing said clock frequency from said prescribed minimum value to said adjusted value that is higher than said prescribed minimum value, if a count value of said digital counter circuit corresponding to said reference time duration is less than or equal to an adjustable threshold value; and
   after said receiving of said first data packet and said determining of said reference time duration, maintaining said clock frequency at said prescribed minimum value without change, if said count value of said digital counter circuit corresponding to said reference time duration is greater than said adjustable threshold value.

10. The method according to claim 1, wherein said reference symbol is a first one of said symbols in said header section.

11. The method according to claim 10, wherein said reference time duration of said reference symbol is a minimum time duration among all time durations of all of said symbols in said header section.

12. The method according to claim 10, wherein said reference time duration of said reference symbol is a maximum time duration among all time durations of all of said symbols in said header section.

13. A method of carrying out a wireless data transmission between first and second units including a base station and a transponder, comprising the following steps:
   a) modulating a data packet onto an electromagnetic carrier wave and transmitting said carrier wave with said data packet modulated thereon from said first unit to said second unit, wherein said data packet includes a header section containing at least one symbol including a reference symbol, and further includes at least one further section;
   b) receiving said carrier wave with said data packet modulated thereon in said second unit;
   c) in said second unit, determining a reference time duration of said reference symbol in said header section of said data packet;
   d) in said second unit, adjusting, to an adjusted value dependent on said reference time duration, a parameter that determines at least one property comprising a time resolution of an encoding and/or decoding process used for encoding and/or decoding encoded data in said second unit.

14. The method according to claim 13, wherein said first unit is said base station, said second unit is said transponder, and said transmitting in said step a) is an active transmitting of said electromagnetic carrier wave from said base station to said transponder.

15. The method according to claim 13, wherein said first unit is said transponder, said second unit is said base station, and said transmitting in said step a) is a passive backscattering reflection of said electromagnetic carrier wave from said transponder back to said base station.

16. The method according to claim 13, wherein:
   said at least one symbol in said header section further includes a data encoding symbol;
   said at least one further section of said data packet is a data section containing said encoded data that is encoded by data characters defined with reference to said data encoding symbol; and
   said method further comprises a step, in said second unit, of decoding said encoded data using said decoding process having said time resolution thereof determined by said parameter adjusted to said adjusted value.

17. The method according to claim 16,
   further comprising determining a time duration of said data encoding symbol in said header section,
   wherein:
   said decoding of said, encoded data using said decoding process comprises recognizing said data characters by determining respective, time durations of said data characters in said data section relative to said time duration of said data encoding symbol;
   said determining of said respective time durations in said decoding process is carried out by a time acquisition unit;
   said time resolution of said decoding process is a time resolution of said determining of said respective time durations in said decoding process carried out in said time acquisition unit; and
   said time acquisition unit includes an RC charging circuit as a time counter and said parameter is a charging current of said RC charging circuit, or said time acquisition unit includes a digital counter circuit as a time counter and said parameter is a clock frequency of said digital counter circuit.

18. The method according to claim 13, wherein said parameter is a charging current of an RC-circuit that is used for said determining of said reference time duration.

19. The method according to claim 18, wherein said at least one symbol in said header section additionally includes a further symbol, and said method additionally comprises determining a time duration of said further symbol using said RC-circuit.

20. The method according to claim 18, further comprising:
   initially setting said charging current to a prescribed minimum value before said receiving of said data packet being a first data packet of a complete transmission including plural successive data packets;
   after said receiving of said first data packet and said determining of said reference time duration, increasing said charging current from said prescribed minimum value to said adjusted value that is higher than said prescribed minimum value, if a voltage value of said RC-circuit corresponding to said reference time duration is less than or equal to an adjustable threshold value; and
   after said receiving of said first data packet and said determining of said reference time duration, maintaining said charging current at said prescribed minimum value without change, if said voltage value of said RC-circuit corresponding to said reference time duration is greater than said adjustable threshold value.

21. The method according to claim 13, wherein said parameter is a clock frequency of a digital counter circuit that is used for said determining of said reference time duration.

22. The method according to claim 21, wherein said at least one symbol in said header section additionally includes a further symbol, and said method additionally comprises determining a time duration of said further symbol using said digital counter circuit.

23. The method according to claim 21, further comprising:
   initially setting said clock frequency to a prescribed minimum value before said receiving of said data packet being a first data packet of a complete transmission including plural successive data packets;
   after said receiving of said first data packet and said determining of said reference time duration, increasing said clock frequency from said prescribed minimum value to said adjusted value that is higher than said prescribed minimum value, if a count value of said digital counter circuit corresponding to said reference time duration is less than or equal to an adjustable threshold value; and
   after said receiving of said first data packet and said determining of said reference time duration, maintaining said clock frequency at said prescribed minimum value without change, if said count value of said digital counter circuit corresponding to said reference time duration is greater than said adjustable threshold value.

24. The method according to claim 13, wherein said at least one symbol in said header section comprises a plurality of symbols including said reference symbol and at least one further symbol, and wherein said reference symbol is a first one of said symbols in said header section.

25. The method according to claim 24, wherein said reference time duration of said reference symbol is a minimum time duration among all time durations of all of said symbols in said header section.

26. The method according to claim 24, wherein said reference time duration of said reference symbol is a maximum time duration among all time durations of all of said symbols in said header section.

27. A transponder for carrying out a wireless data transmission between said transponder and a base station by actively or passively transmitting an electromagnetic carrier wave with a data packet modulated thereon, wherein said data packet includes a header section containing at least one symbol including a reference symbol, wherein said transponder comprises:

a modulator/demodulator unit;

an encoding/decoding unit that includes a time acquisition unit and that is coupled with said modulator/demodulator unit; and a control unit that includes a memory and that is coupled with said encoding/decoding unit;

wherein:

said modulator/demodulator unit is adapted to modulate said data packet onto said carrier wave or demodulate said data packet from said carrier wave;

said encoding/decoding unit is adapted to encode or decode data in said data packet;

said time acquisition unit is adapted to determine a reference time duration of said reference symbol in said header section of said data packet;

said memory is adapted to store therein said reference time duration; and said control unit is adapted to actuate said encoding/decoding unit in a controlled manner by adjusting a control parameter of said time acquisition unit dependent on said reference time duration, and said encoding/decoding unit is adapted so that said control parameter determines a time resolution of said encoding/decoding unit for encoding or decoding said data in said data packet.

28. The transponder according to claim 27, wherein:

said at least one symbol in said header section further includes a data encoding symbol;

said at least one further section of said data packet is a data section containing encoded data that is encoded by data characters defined with reference to said data encoding symbol;

said time acquisition unit is further adapted to determine a symbol time duration of said data encoding symbol in said header section;

said encoding/decoding unit is adapted to decode said data by recognizing said data characters by determining respective time durations of said data characters relative to said symbol time duration using said time acquisition unit; and said time acquisition unit includes an RC charging circuit as a time counter and said control parameter is a charging current of said RC charging circuit, or said time acquisition unit includes a digital counter circuit as a time counter and said control parameter is a clock frequency of said digital counter circuit.

* * * * *